(12) United States Patent
Wei et al.

(10) Patent No.: US 9,853,825 B2
(45) Date of Patent: Dec. 26, 2017

(54) SINGLE CELL POINT TO MULTI-POINTS NETWORK SYSTEM AND DATA TRANSMISSION METHOD THEREOF

(71) Applicant: Institute For Information Industry, Taipei (TW)

(72) Inventors: Chia-Hung Wei, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 86 days.

(21) Appl. No.: 15/093,617

(22) Filed: Apr. 7, 2016

(65) Prior Publication Data

US 2016/0301538 A1 Oct. 13, 2016

Related U.S. Application Data

(60) Provisional application No. 62/145,522, filed on Apr. 10, 2015.

(51) Int. Cl.
| | | |
|---|---|---|
| *H04L 12/18* | (2006.01) | |
| *H04L 1/18* | (2006.01) | |
| *H04L 1/00* | (2006.01) | |

(52) U.S. Cl.
CPC ........ *H04L 12/1868* (2013.01); *H04L 1/1816* (2013.01); *H04L 1/1867* (2013.01); *H04L 2001/0093* (2013.01)

(58) Field of Classification Search
CPC . H04L 12/1868; H04L 1/1816; H04L 1/1867; H04L 2001/0093
See application file for complete search history.

(56) References Cited

U.S. PATENT DOCUMENTS

| | | | |
|---|---|---|---|
| 7,624,325 B2 | 11/2009 | Lee et al. | |
| 8,250,423 B2 | 8/2012 | Dinan | |
| 8,453,029 B2 | 5/2013 | Dinan | |
| 2005/0041610 A1* | 2/2005 | Lee | H04W 72/005 370/312 |
| 2010/0254352 A1* | 10/2010 | Wang | H04W 72/005 370/332 |
| 2010/0290383 A1* | 11/2010 | Wu | H04L 1/1607 370/312 |

(Continued)

FOREIGN PATENT DOCUMENTS

EP 2046070 A1 4/2009

OTHER PUBLICATIONS

Office Action to the corresponding Taiwan Patent Application rendered by the Taiwan Intellectual Property Office (TIPO) dated Jan. 9, 2017, 13 pages.

*Primary Examiner* — Duc C Ho
(74) *Attorney, Agent, or Firm* — Skaar Ulbrich Macari, P.A.

(57) ABSTRACT

A single cell point to multi-points (SC-PTM) network system and a data transmission method thereof are provided. The SC-PTM network system includes a base station and a first mobile station group and a second mobile station group. The base station multicasts a message to the mobile station groups via a first bearer, and receives a plurality of confirmation notifications from the mobile station groups. The base station determines a data transmitting status of the mobile stations and re-transmits the message to the mobile stations of the group which has higher priority.

25 Claims, 10 Drawing Sheets

(56) References Cited

U.S. PATENT DOCUMENTS

2014/0036676 A1\* 2/2014 Purnadi ............. H04W 36/0055
　　　　　　　　　　　　　　　　　　　　　370/235
2016/0119762 A1\* 4/2016 Zhu ........................ H04W 4/10
　　　　　　　　　　　　　　　　　　　　　370/312
2016/0285935 A1\* 9/2016 Wu ..................... H04L 65/4076

\* cited by examiner

SINGLE CELL POINT TO MULTI-POINTS NETWORK SYSTEM AND DATA TRANSMISSION METHOD THEREOF

PRIORITY

This application claims priority to U.S. Provisional Patent Application No. 62/145,522 filed on Apr. 10, 2015, which is hereby incorporated by reference in its entirety.

FIELD

The present invention relates to a single cell point to multi-points (SC-PTM) network system and a data transmission method thereof. More particularly, the SC-PTM network system and the data transmission method thereof of the present invention adjust the use of the bearer and re-transmit data according to the accessing statuses of different numbers of mobile stations.

BACKGROUND

Under the conventional evolved Multimedia Broadcast Multicast Service (eMBMS) architecture, a base station broadcasts messages to multiple mobile stations within the communication coverage thereof mainly via a single bearer so that the mobile stations can receive the relevant messages. However, no satisfactory data re-transmission mechanism is available in the eMBMS architecture. Thus, if any mobile station misses part of the broadcasted messages, then it can only continue to receive the subsequent messages but cannot re-acquire the message previously missed.

Accordingly, if the mobile station needs to further use the Single Cell Point to multi-points network system (SC-PTM) service under the eMBMS architecture to transmit messages and a high reliability is required in the message transmission, the mobile station will be unable to obtain the relevant information efficiently and correctly because of the unavailability of a satisfactory data re-transmission mechanism in the eMBMS architecture.

Accordingly, an urgent need exists in the art to make improvement on the drawbacks of the aforesaid conventional eMBMS technology so that the mobile station can obtain the messages multicasted by the base station more efficiently and correctly with the SC-PTM service.

SUMMARY

The disclosure includes a data transmission method for a base station. The base station is used in a Single Cell Point to Multi-Points (SC-PTM) network system. The SC-PTM network system further comprises a plurality of first mobile stations and a plurality of second mobile stations. The first mobile stations belong to a first mobile station group and the second mobile stations belong to a second mobile station group. The base station multicasts a first message to the first mobile stations of the first mobile station group and the second mobile stations of the second mobile station group via a first bearer.

The data transmission method may include the following steps of: (a) enabling the base station to receive a plurality of first confirmation notifications and a plurality of second confirmation notifications respectively from the first mobile stations and the second mobile stations via the first bearer; (b) enabling the base station to determine a first count of at least one third mobile station that has not received the first message according to the first confirmation notifications, and determine a second count of at least one fourth mobile station that has not received the first message according to the second confirmation notifications; (c) enabling the base station to determine that the first count is not greater than a first count threshold and a sum of the first count and the second count is greater than the first count threshold; (d) enabling the base station to transmit a first bearer switching instruction to the at least one third mobile station via the first bearer according to the result of the step (c), wherein the first bearer switching instruction is adapted to notify the at least one third mobile station to receive the first message via a second bearer; and (e) enabling the base station to transmit the first message to the at least one third mobile station via the second bearer, wherein the base station transmits messages to the at least one third mobile station continuously via the second bearer.

The disclosure also includes a data transmission method for a base station. The base station is used in a Single Cell Point to Multi-Points (SC-PTM) network system. The SC-PTM network system further comprises a plurality of first mobile stations and a plurality of second mobile stations. The first mobile stations belong to a first mobile station group and the second mobile stations belong to a second mobile station group. The base station multicasts a first message to the first mobile stations of the first mobile station group and the second mobile stations of the second mobile station group via a first bearer.

The data transmission method may include the following steps of: (a) enabling the base station to receive a plurality of first confirmation notifications and a plurality of second confirmation notifications respectively from the first mobile stations and the second mobile stations via the first bearer; (b) enabling the base station to determine a first count of at least one third mobile station that has not received the first message according to the first confirmation notifications, and determine a second count of at least one fourth mobile station that has not received the first message according to the second confirmation notifications; (c) enabling the base station to determine that a sum of the first count and the second count is not greater than a first count threshold; (d) enabling the base station to transmit a first bearer switching instruction to the at least one third mobile station and the at least one fourth mobile station via the first bearer according to the result of the step (c), wherein the first bearer switching instruction is adapted to notify the at least one third mobile station and the at least one fourth mobile station to receive the first message via a second bearer; and (e) enabling the base station to transmit the first message to the at least one third mobile station and the at least one fourth mobile station via the second bearer, wherein the base station transmits messages to the at least one third mobile station and the at least one fourth mobile station continuously via the second bearer.

The disclosure further includes a base station being used in an SC-PTM network system. The base station comprises a transceiving unit and a processing unit, and executes the aforesaid data transmission method via the transceiving unit and the processing unit.

The disclosure additionally includes a data transmission method for a mobile station. The mobile station is used in a SC-PTM network system and belongs to a first mobile station group. The SC-PTM network system further comprises a base station. The base station multicasts a first message to the mobile stations of the first mobile station group via a first bearer. The data transmission method comprises the following steps of: (a) enabling the mobile station to determine that reception of the first message fails;

(b) enabling the mobile station to transmit a negative acknowledgement (NACK) to the base station via the first bearer according to the result of the step (a); (c) enabling the mobile station to receive a first bearer switching instruction from the base station after the step (b); and (d) enabling the mobile station to receive the first message from the base station via a second bearer according to the first bearer switching instruction, wherein the mobile station continuously receives via the second bearer messages transmitted by the base station.

The disclosure further includes a mobile station being used in an SC-PTM network system. The mobile station comprises a transceiving unit and a processing unit, and executes the aforesaid data transmission method via the transceiving unit and the processing unit.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or implementations described in these example embodiments. Therefore, description of these example embodiments is only for purpose of illustration rather than to limit the present invention. In the following embodiments and the attached drawings, elements unrelated to the present invention are omitted from depiction; and dimensional relationships among individual elements in the attached drawings are illustrated only for ease of understanding, but not to limit the actual scale.

Figure 1A:
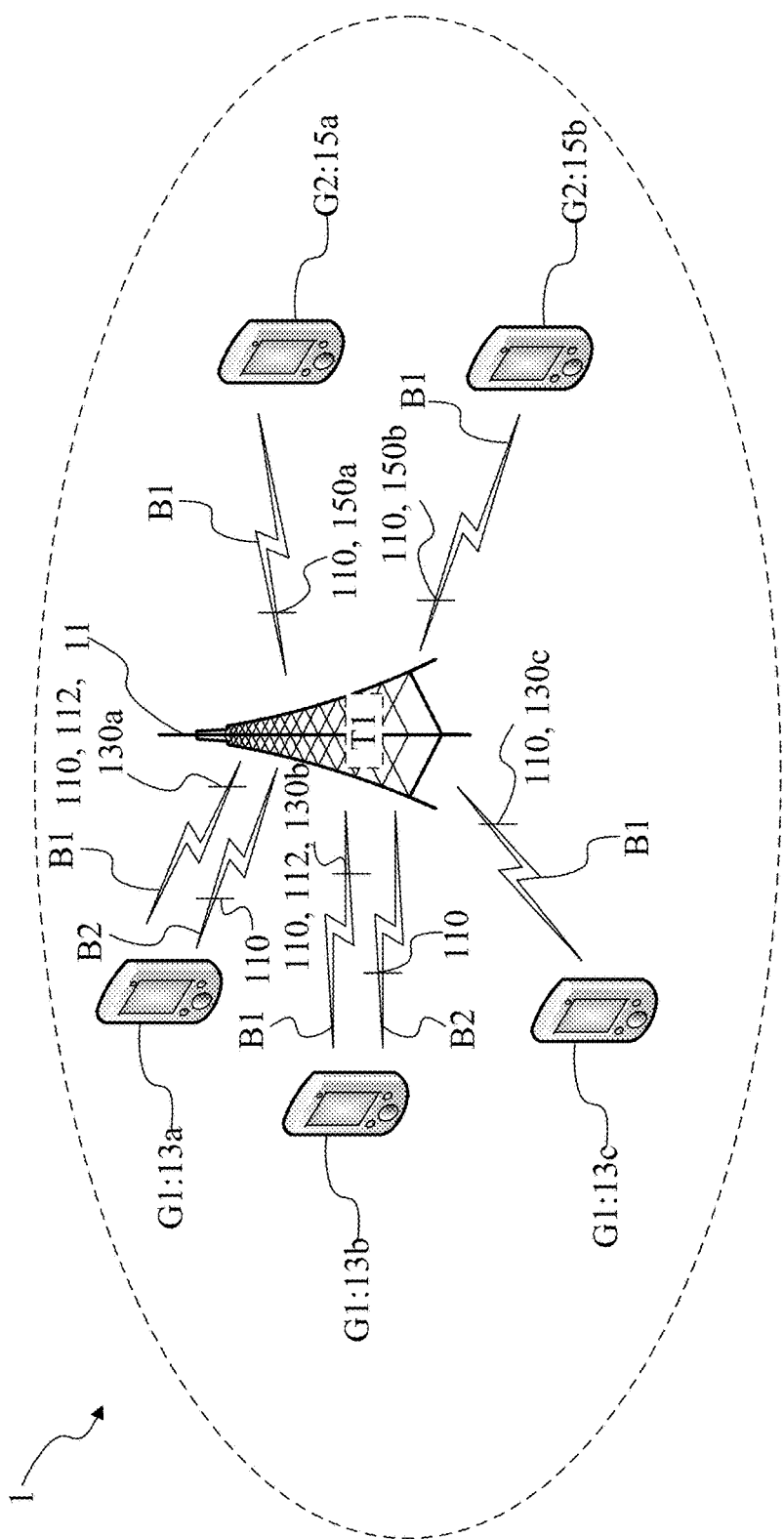
FIG. 1A is a schematic view of a SC-PTM network system according to a first embodiment of the present invention.
Figure 1B:
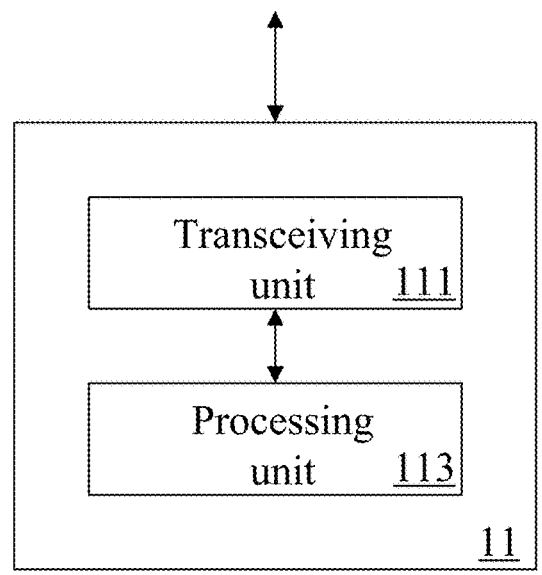
FIG. 1B is a block diagram of a base station according to the first embodiment of the present invention.
Figure 1C:
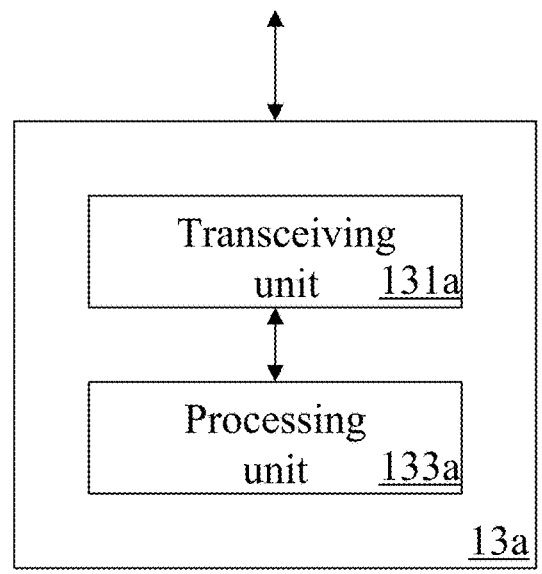
FIG. 1C is a block diagram of a mobile station according to the first embodiment of the present invention.

Please refer to FIG. 1A to FIG. 1C. FIG. 1A is a schematic view of a Single Cell Point to Multi-Points (SC-PTM) network system 1 according to a first embodiment of the present invention, and the SC-PTM network system 1 comprises a base station 11, a plurality of first mobile stations 13a~13c and a plurality of second mobile stations 15a~15b.

The first mobile stations 13a~13c belong to a first mobile station group G1, and the second mobile stations 15a~15b belong to a second mobile station group G2. FIG. 1B is a block diagram of the base station 11 according to the first embodiment of the present invention, and the base station 11 comprises a transceiving unit 111 and a processing unit 113.

FIG. 1C is a block diagram of the first mobile station 13a according to the first embodiment of the present invention, and the first mobile station 13a comprises a transceiving unit 131a and a processing unit 133a. It shall be particularly appreciated that, the hardware architecture of the first mobile stations 13b~13c and the second mobile stations 15a~15b is the same as that of the first mobile station 13a, and thus only the first mobile station 13a is illustrated herein as an example for ease of understanding, as will be readily appreciated by those skilled in the art. The interaction between the SC-PTM network system 1 and the devices thereof will be further described hereinafter.

First, the base station 11 communicates with the first mobile stations 13a~13c within the communication coverage thereof, and the processing unit 111 uses the transceiving unit 113 to multicast a first message 110 to the first mobile stations 13a~13c and the second mobile stations 15a~15b via a first bearer B1. Next, the first mobile stations 13a~13c and the second mobile stations 15a~15b respectively transmit first confirmation notifications 130a~130c and second confirmation notifications 150a~150b back to the base station 11 depending on whether the reception of the first message 110 is correct. In other words, the processing unit 113 of the base station 11 uses the transceiving unit 111 to receive the first confirmation notifications 130a~130c and second confirmation notifications 150a~150b respectively from the first mobile stations 13a~13c and the second mobile stations 15a~15b via the first bearer B1.

In the first embodiment, the first mobile station 13c and the second mobile station 15a receive the first message 110 correctly, so each of the first confirmation notification 130c and the second confirmation notification 150a that are transmitted back is an acknowledgement (ACK). On the other hand, when the processing unit 133a of the first mobile station 13a uses the transceiving unit 131a to receive the first message 110 from the base station 11, the processing unit 133a determines that the reception of the first message 110 fails, and thus the first confirmation notification 130a transmitted back by the first mobile station 13a is a negative acknowledgement (NACK). Similarly, the first mobile station 13b and the second mobile station 15b determine that the reception of the first message 110 fails, and thus each of the first confirmation notification 130b and the second confirmation notification 150b is an NACK.

Next, the processing unit 113 of the base station 11 determines a first count N1 of at least one third mobile station that has not received the first message 110 according to the first confirmation notifications 130a~130c, and determine a second count N2 of at least one fourth mobile station that has not received the first message 110 according to the second confirmation notifications 150a~150b. In the first embodiment, the at least one third mobile station is the first mobile stations 13a and 13b, so the first count N1 is two; and the at least one fourth mobile station is the second mobile station 15b, so the second count N2 is one.

Thereafter, the processing unit 113 of the base station 11 determines the relationships of the first count N1 and the second count N2 with a first count threshold T1. The first count threshold T1 may be a value set arbitrarily by the base station 11 according to user requirements and the network environment. In the first embodiment, if the base station 11 determines that a sum of the first count N1 and the second count N2 is greater than the first count threshold T1, then it means that the resources of the base station 11 are insufficient to create a second bearer for re-transmitting data to the at least one third mobile station and the at least one fourth mobile station at the same time. Therefore, when the at least one third mobile station belongs to the first mobile station group of a higher priority, the base station 11 first re-transmits data to the at least one third mobile station.

On the other hand, if the first count N1 is greater than the first count threshold T1, then it means that too many mobile stations in the first mobile station group have not received the message, and thus the base station 11 may select to re-transmit the message directly via the first bearer. On the other hand, if the first count N1 is smaller than the first count threshold T1, then it means that only part of the mobile stations in the first mobile station group have not received the message, and thus other operations will be performed by the base station 11.

In this embodiment, it is assumed that the first count threshold T1 is two. Accordingly, after the processing unit 113 of the base station 11 determines that the first count N1 is not greater than the first count threshold T1 and further determines that the sum of the first count N1 and the second count N2 is greater than the first count threshold T1, the processing unit 113 of the base station 11 uses the transceiving unit 111 to transmit a first bearer switching instruction 112 to the at least one third mobile station (i.e., the first mobile stations 13a and 13b) via the first bearer B1 so as to notify the at least one third mobile station (i.e., the first mobile stations 13a and 13b) to re-receive the first message 110 via a second bearer B2.

Next, the processing unit 113 of the base station 11 uses the transceiving unit 111 to re-transmit the first message 110 to the at least one third mobile station (i.e., the first mobile stations 13a and 13b) via the second bearer B2. In other words, the processing unit 133a of the first mobile station 13a uses the transceiving unit 131a to receive the first bearer switching instruction 112 from the base station 11 via the first bearer B1, and then uses the transceiving unit 131a to re-receive the first message 110 from the base station 11 via the second bearer B2 according to the first bearer switching instruction 112. Similarly, the first mobile station 13b re-receives the first message 110 from the base station 11 via the second bear B2.

Further speaking, the processing unit 113 of the base station 11 then transmits messages to the at least one third mobile station (i.e., the first mobile stations 13a and 13b) continuously via the second bearer B2 by use of the transceiving unit 111. On the other hand, the transceiving unit 131a of the first mobile station 13a continuously receives the messages transmitted by the base station 11 via the second bearer B2. Similarly, the first mobile station 13b continuously receives the messages transmitted by the base station 11 via the second bearer B2. In this way, under the SC-PTM network architecture, the present invention can re-transmit the important messages more efficiently and multicast messages correctly via an additional bearer.

It shall be particularly appreciated that, the base station 11 can transmit the message to the at least one third mobile station (i.e., the first mobile stations 13a and 13b) via the second bearer B2 through multicasting or unicasting, and this shall be readily appreciated by those skilled in the art and thus will not be further described herein.

Figure 2:
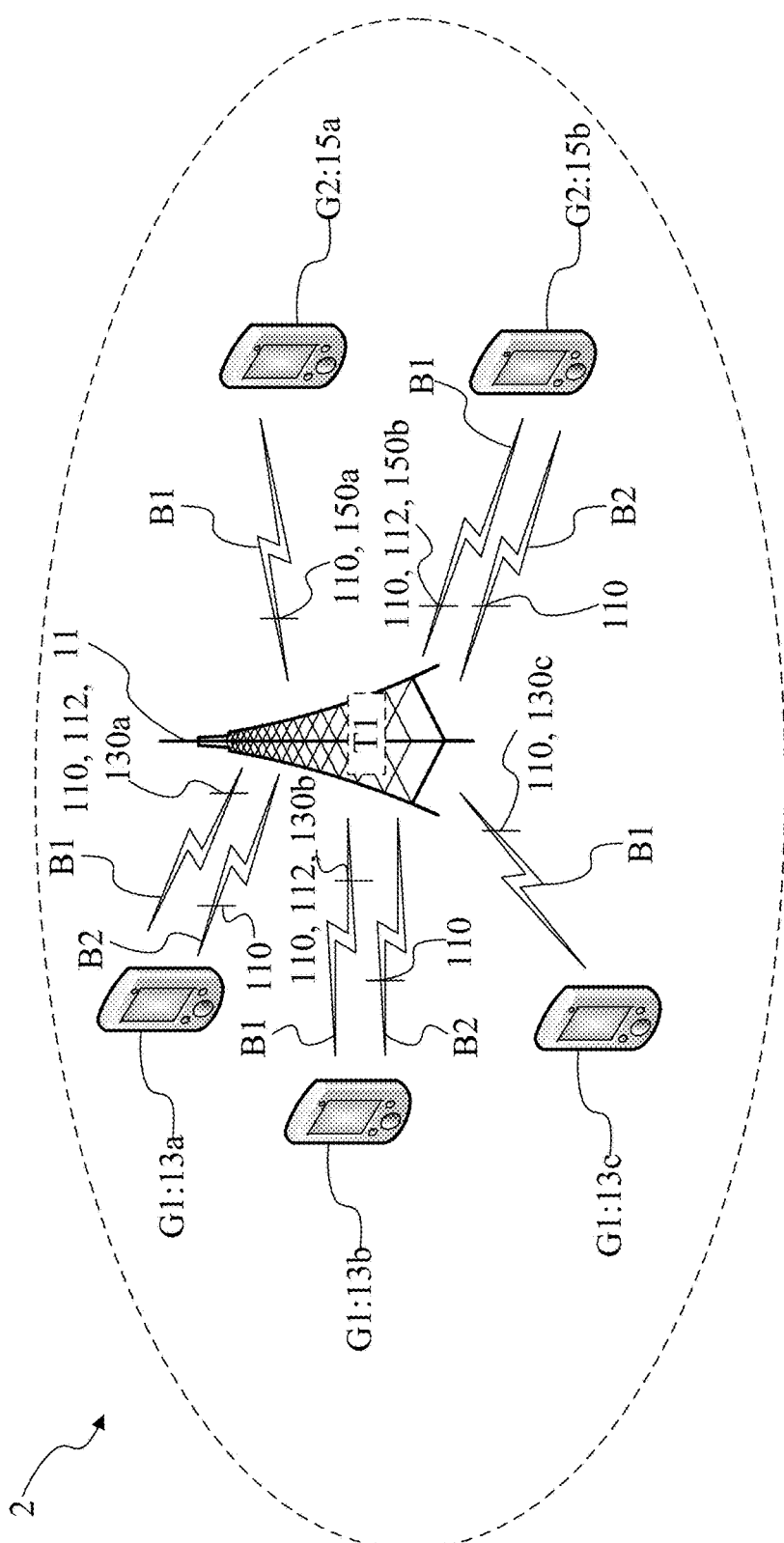
FIG. 2 is a schematic view of a SC-PTM network system according to a second embodiment of the present invention.

Please refer to FIG. 2, which is a schematic view of a SC-PTM network system 2 according to a second embodiment of the present invention. The network architecture of the second embodiment is similar to that of the first embodiment, so the elements labeled by the same reference numbers also have the same functions and thus will not be further described herein. The second embodiment mainly further illustrates an aspect in which the first count threshold T1 is three.

In this embodiment, it is assumed that the first count threshold T1 is three. Accordingly, if the processing unit 113 of the base station 11 determines that the sum of the first count N1 and the second count N2 is not greater than the first count threshold T1, then it means that the resources of the base station 11 are sufficient to create the second bearer for re-transmitting data the to at least one third mobile station and the at least one fourth mobile station at the same time. Therefore, the base station 11 can re-transmit data to the mobile stations of the first mobile station group G1 and the second mobile station group G2 at the same time.

In detail, the processing unit 113 of the base station 11 transmits the first bearer switching instruction 112 to the at least one third mobile station (i.e., the first mobile stations 13a and 13b) and the at least one fourth mobile station (i.e., the second mobile station 15b) via the first bearer B1 by use of the transceiving unit 111 so as to notify the at least one third mobile station (i.e., the first mobile stations 13a and 13b) and the at least one fourth mobile station (i.e., the second mobile station 15b) to re-receive the first message 110 via the second bearer B2.

Next, the processing unit 113 of the base station 11 uses the transceiving unit 111 to re-transmit the first message 110 to the at least one third mobile station (i.e., the first mobile stations 13a and 13b) and the at least one fourth mobile station (i.e., the second mobile station 15b) via the second bearer B2. In other words, the first mobile stations 13a and 13b and the second mobile station 15b re-receive the first message 110 from the base station 11 via the second bearer B2. Similarly, the processing unit 113 of the base station 11 then transmits messages to the at least one third mobile station (i.e., the first mobile stations 13a and 13b) and the at least one fourth mobile station (i.e., the second mobile station 15b) continuously via the second bearer B2 by use of the transceiving unit 111.

Figure 3:
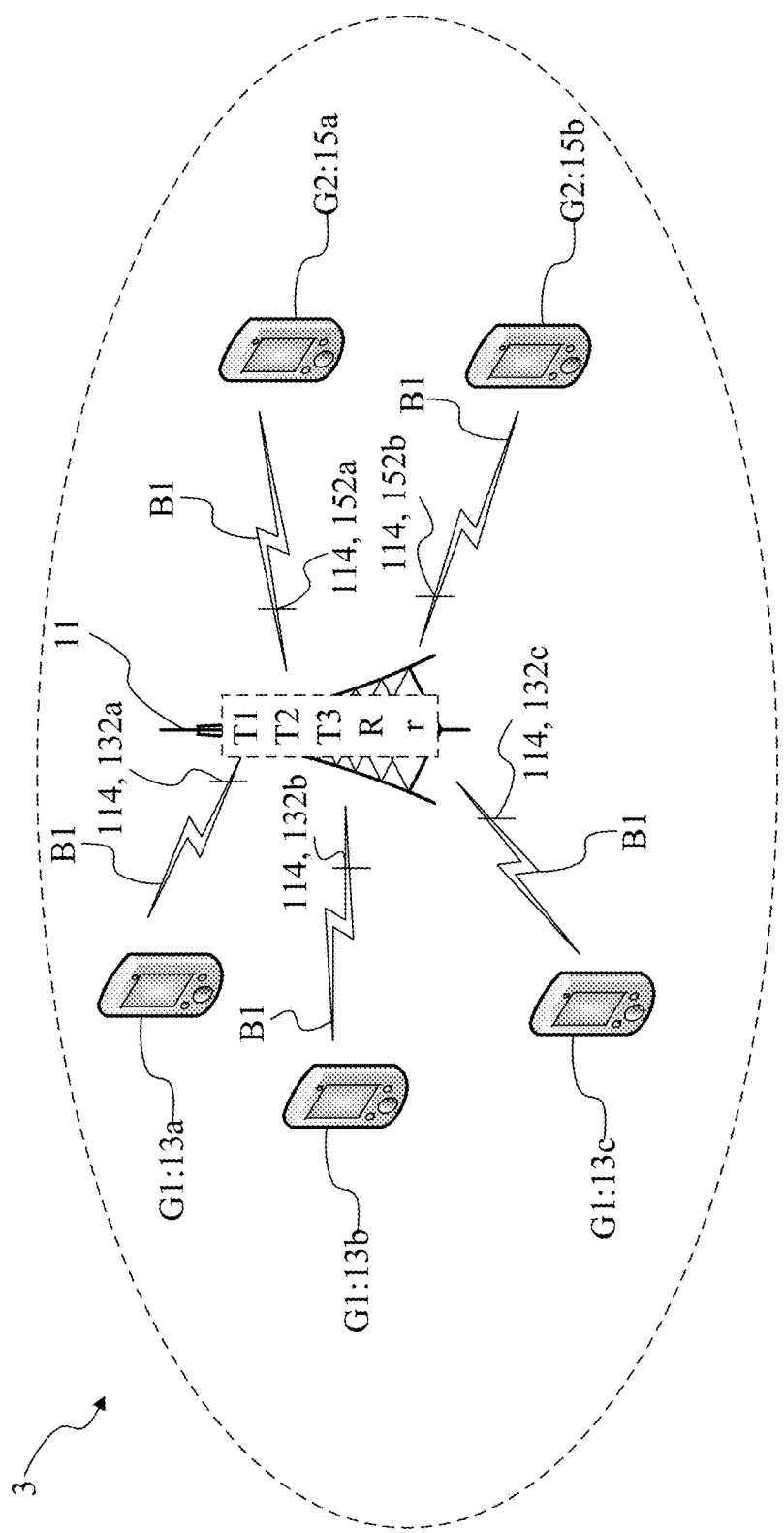
FIG. 3 is a schematic view of a SC-PTM network system according to a third embodiment of the present invention.

Please refer to FIG. 3, which is a schematic view of a SC-PTM network system 3 according to a third embodiment of the present invention. The network architecture of the third embodiment is similar to those of the aforesaid embodiments, so the elements labeled by the same reference numbers also have the same functions and thus will not be further described herein. The third embodiment mainly further illustrates how the base station adjusts a rate of the Modulation and Coding Scheme (MCS) according to the feedbacks from mobile stations.

This embodiment will be described with respect to the process flow of the previous first embodiment or second embodiment, the base station 11 similarly communicates with the first mobile stations 13a~13c and the second mobile stations 15a~15b within the communication coverage thereof. In the third embodiment, the processing unit 111 multicasts a second message 114 to the first mobile stations 13a~13c and the second mobile stations 15a~15b via the first bearer B1. Next, the first mobile stations 13a~13c and the second mobile stations 15a~15b respectively transmit third confirmation notifications 132a~132c and 152a~152b back to the base station 11 depending on whether the reception of the second message 114 is correct.

Thereafter, the first mobile stations 13b~c and the second mobile station 15a receive the second message 114 correctly, so each of the third confirmation notifications 132b~2c and 152b that are transmitted back is an ACK. On the other hand, the first mobile station 13a and the second mobile station 15a determine that the reception of the second message 114 fails, and thus each of the third confirmation notifications 132a and 152a transmitted back by the first mobile station 13a and the second mobile station 15a is an NACK.

Accordingly, the processing unit 113 of the base station 11 can determine a third count N3 of at least one fifth mobile station that has not received the second message 114 and a fourth count N4 of at least one sixth mobile station that has not received the first message 110 and the second message 114 according to the first confirmation notifications 130a~130c, the second confirmation notifications 150a~150b and the third confirmation notifications 132a~132d and 152a~152b. In this aspect, the at least one fifth mobile station includes the first mobile station 13a and the second mobile station 15a, so the third count N3 is two; and the at least one sixth mobile station only includes the first mobile station 13a, so the fourth count N4 is one.

Next, the processing unit 113 of the base station 11 determines whether a ratio of the fourth count N4 to the third count N3 (i.e., ½) is smaller than a first ratio threshold r and meanwhile determines whether the third count N3 is smaller than a second count threshold T2. If it is assumed that the first ratio threshold r is 0.55 and the second count threshold T2 is 2.5, then the aforesaid two conditions are satisfied at the same time, i.e., the ratio of the fourth count N4 to the third count N3 is smaller than the ratio threshold r and the third count N3 is smaller than the second count threshold T2.

This means that, for the mobile station that has failed to receive the messages consecutively, (1) the ratio is lower than the threshold, and (2) the sample count is lower than a preset value. Accordingly, the possibility that the mobile station successfully receives the message is within the reasonable range, so the processing unit 113 of the base station 11 will increase a rate of the MCS as an attempt to improve the efficiency of network message transmission.

In another implementation, the second mobile station 15a receives the second message 114 correctly, so the third confirmation notification 152a that is transmitted back is an ACK. On the other hand, the first mobile stations 13a~13c and the second mobile station 15b determine that the reception of the second message 114 fails, and thus each of the third confirmation notifications 132a~132c and 152b transmitted back by the first mobile stations 13a~13c and the second mobile station 15b is an NACK.

Accordingly, the processing unit 113 of the base station 11 can determine the third count N3 of at least one fifth mobile station that has not received the second message 114 and the fourth count N4 of at least one sixth mobile station that has not received the first message 110 and the second message 114 according to the first confirmation notifications 130a~130c, the second confirmation notifications 150a~150b and the third confirmation notifications 132a~132c and 152a~152b. In this aspect, the at least one fifth mobile station includes the first mobile stations 13a~13c and the second mobile station 15b, so the third count N3 is four; and the at least one sixth mobile station includes the first mobile stations 13a~13b and the second mobile station 15b, so the fourth count N4 is three.

Next, the processing unit 113 of the base station 11 determines whether a ratio of the fourth count N4 to the third count N3 (i.e., 0.75) is greater than a second ratio threshold R and meanwhile determines whether the third count N3 is greater than a third count threshold T3. If the second ratio threshold R is 0.7 and the third count threshold T3 is 3.5, then the aforesaid two conditions are satisfied at the same time because the ratio of the fourth count N4 to the third count N3 is greater than the second ratio threshold R and the third count N3 is greater than the third count threshold T3.

This means that, for the mobile station that has failed to receive the messages consecutively, (1) the ratio is higher than the threshold, and (2) the sample count is higher than a preset value. Accordingly, the possibility that the mobile station successfully receives the message is undesirable, so the processing unit 113 of the base station 11 will decrease a rate of the MCS as an attempt to improve the possibility of successful message transmission.

It shall be particularly noted that, the aforesaid numerical values are illustrative in nature for ease understanding of the technology of the present invention and are not intended to limit the present invention. How to achieve the desired rate of the MCS by adjusting the ratio threshold and the count threshold shall be readily appreciated by those skilled in the art based on the aforesaid disclosure of the present invention.

Figure 4:
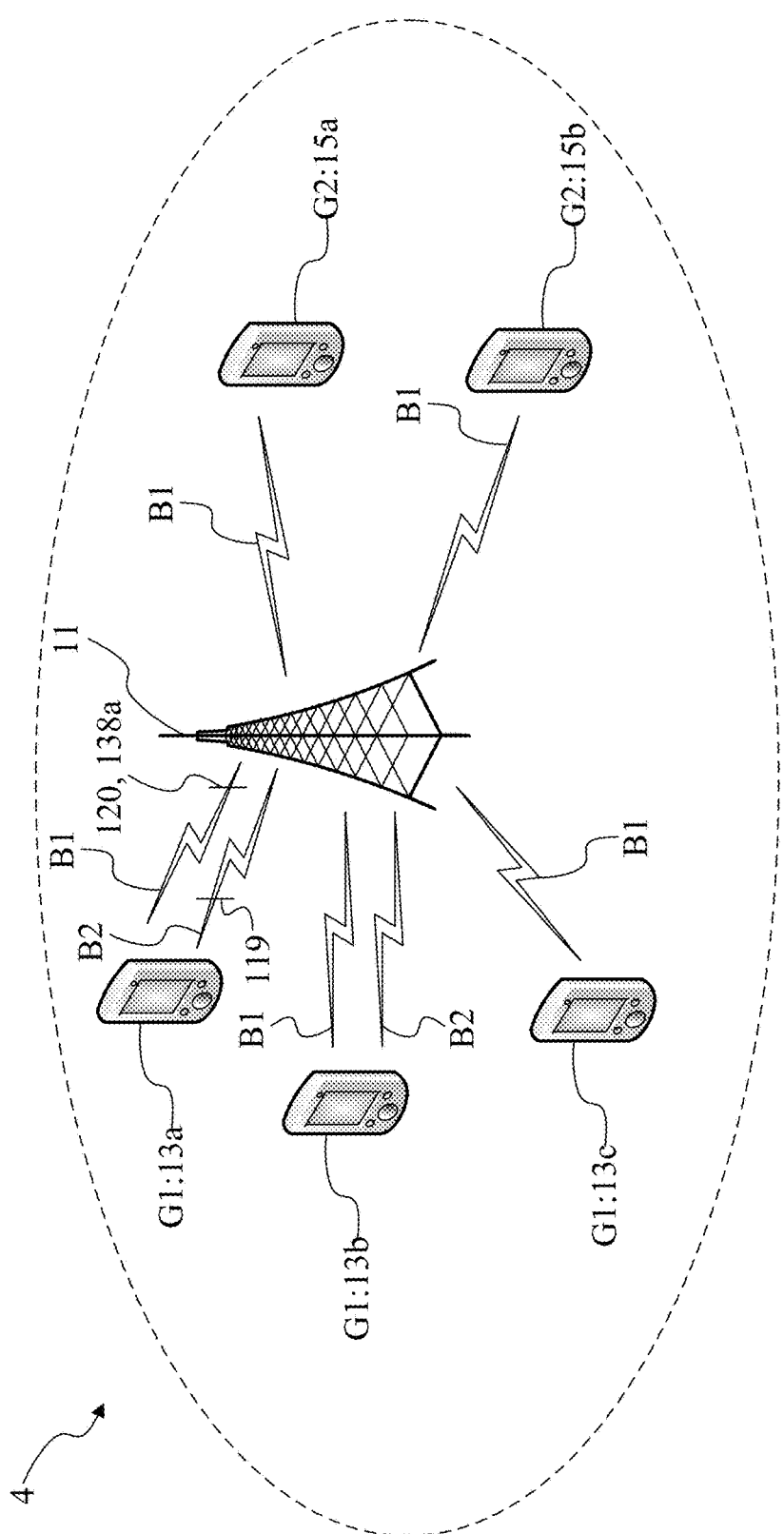
FIG. 4 is a schematic view of a SC-PTM network system according to a fourth embodiment of the present invention.

Please refer to FIG. 4, which is a schematic view of a SC-PTM network system 4 according to a fourth embodiment of the present invention. The network architecture of the fourth embodiment is similar to that of the first embodiment, so the elements labeled by the same reference numbers also have the same functions and thus will not be further described herein. The fourth embodiment mainly further illustrates how to switch the bearer.

This embodiment will be described with respect to the process flow of the previous first embodiment, the base station 11 similarly communicates with the first mobile stations 13a~13c within the communication coverage thereof, and at least one third mobile station includes a fifth mobile station that continuously communicates with the base station 11 via the second bearer B2. In the fourth embodiment, the at least one third mobile station includes the first mobile stations 13a and 13b, and the fifth mobile station of the fourth embodiment is described hereinafter by taking the first mobile station 13a as an example.

When the processing unit 113 of the base station 11 continuously transmits messages to the first mobile station 13a via the second bearer B2 by use of the transceiving unit 111, the processing unit 113 still multicasts messages via the first bearer B1. In other words, when the processing unit 133a of the first mobile station 13a receives the messages via the second bearer B2 by use of the transceiving unit 131a, the processing unit 133a may still receive the multicasted messages via the first bearer B1.

Accordingly, if the processing unit 133a of the first mobile station 13a continuously determines that the messages received via the first bearer B1 are all correct during a subsequent time period (not shown), then the first mobile station 13a can continuously transmit at least one ACK 138a to the base station 11 by use of the transceiving unit 131a so as to notify the base station 11 that the first bearer B1 can be used normally now.

Therefore, when the processing unit 113 of the base station 11 continuously receives the at least one ACK 138a by use of the transceiving unit 111 within a time period, it can further transmit a second bearer switching instruction 119 to the first mobile station 13a via the second bearer B2 by use of the transceiving unit 111. The second bearer switching instruction 119 is adapted to notify the first mobile station 13a to switch back to the first bearer B1 for message reception.

It shall be particularly appreciated that, the aforesaid implementation of continuously receiving at least one ACK 138a during the time period may be achieved in the following three ways of: (a) receiving a specific number of ACKs 138a continuously during the time period; (2) receiving a specific number of ACKs 138a accumulatively during the time period; and (3) continuously receiving ACKs 138a that meet particular message conditions (e.g., the signal strength, the signal quality or the like) during the time period.

In this way, when the processing unit 113 of the base station 11 uses the transceiving unit 111 to multicast a second message 120 via the first bearer B1, the processing unit 133a of the first mobile station 13a can use the transceiving unit 131a to correctly receive the second message 120 via the first bearer B1. Thereby, the network resources of the second bearer B2 can be released for use by other network devices.

Similarly, the processing unit 113 of the base station 11 then continuously multicasts messages to the at least one third mobile station (i.e., the first mobile station 13a) via the first bearer B1 by use of the transceiving unit 111. On the other hand, the first mobile station 13a continuously receives the messages multicasted subsequently by the base station 11 via the first bearer B1.

Figure 5:
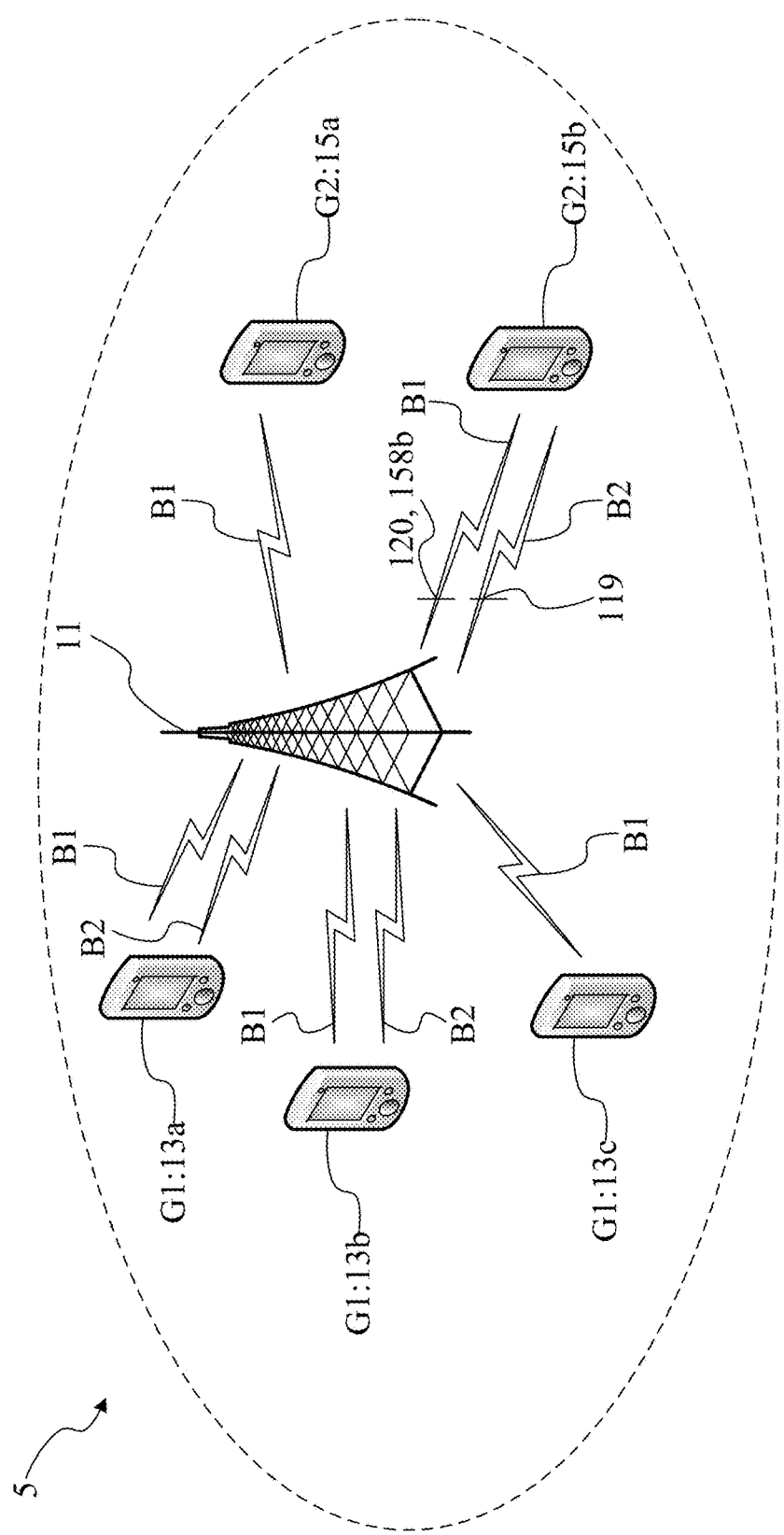
FIG. 5 is a schematic view of a SC-PTM network system according to a fifth embodiment of the present invention.

Please refer to FIG. 5, which is a schematic view of a SC-PTM network system 4 according to a fifth embodiment of the present invention. The network architecture of the fifth embodiment is similar to that of the second embodiment, so the elements labeled by the same reference numbers also have the same functions and thus will not be further described herein. The fifth embodiment mainly further illustrates how to switch the bearer.

This embodiment will be described with respect to the process flow of the previous second embodiment, the base station 11 similarly communicates with the first mobile stations 13a~13c and the second mobile stations 15a~15b within the communication coverage thereof, and at least one third mobile station and at least one fourth mobile station include a fifth mobile station that continuously communicates with the base station 11 via the second bearer B2. In the fifth embodiment, the at least one third mobile station and the at least one fourth mobile station include the first mobile stations 13a and 13b and the second mobile station 15b, and the fifth mobile station of the fifth embodiment is described hereinafter by taking the second mobile station 15b as an example.

Similarly, when the processing unit 113 of the base station 11 continuously transmits messages to the second mobile station 15b via the second bearer B2 by use of the transceiving unit 111, the processing unit 113 still multicasts messages via the first bearer B1. In other words, when the second mobile station 15b receives the messages via the second bearer B2, it may still receive the multicasted messages via the first bearer B1.

Accordingly, if the second mobile station 15b continuously determines that the messages received via the first bearer B1 are all correct during a subsequent time period (not shown), then the second mobile station 15b can continuously transmit at least one ACK 158b to the base station 11 so as to notify the base station 11 that the first bearer B1 can be used normally now.

Therefore, when the processing unit 113 of the base station 11 continuously receives the at least one ACK 158b by use of the transceiving unit 111 within a time period, it can further transmit a second bearer switching instruction 119 to the second mobile station 15b via the second bearer B2 by use of the transceiving unit 111. The second bearer switching instruction 119 is adapted to notify the second mobile station 15b to switch back to the first bearer B1 for message reception.

Similarly, the aforesaid implementation of continuously receiving at least one ACK 158b during the time period may be achieved in the following three ways of: (a) receiving a specific number of ACKs 158b continuously during the time period; (2) receiving a specific number of ACKs 158b accumulatively during the time period; and (3) continuously receiving ACKs 158b that meet particular message conditions (e.g., the signal strength, the signal quality or the like) during the time period.

In this way, when the processing unit 113 of the base station 11 uses the transceiving unit 111 to multicast the second message 120 via the first bearer B1, the second mobile station 15b can correctly receive the second message 120 via the first bearer B1. Thereby, the network resources of the second bearer B2 can be released for use by other network devices.

It shall be further noted that, in the aforesaid embodiments, the base station 11 may implement the bearer switching mainly by use of different media access control (MAC) entities. In detail, the transceiving unit 111 of the base station 11 comprises a first MAC entity (not shown) and a second MAC entity (not shown), the first MAC entity is used for accessing the first bearer B1, and the second MAC entity is used for accessing the second bearer B2.

Accordingly, before the bearer switching (i.e., switching from the first bearer B1 to the second bearer B2 for message transmission) in the aforesaid embodiments, the processing unit 113 of the base station 11 is adapted to forward hybrid automatic repeat request (HARQ) information of the first MAC entity to the second MAC entity to ensure the subsequent correct message transmission.

Figure 6A:
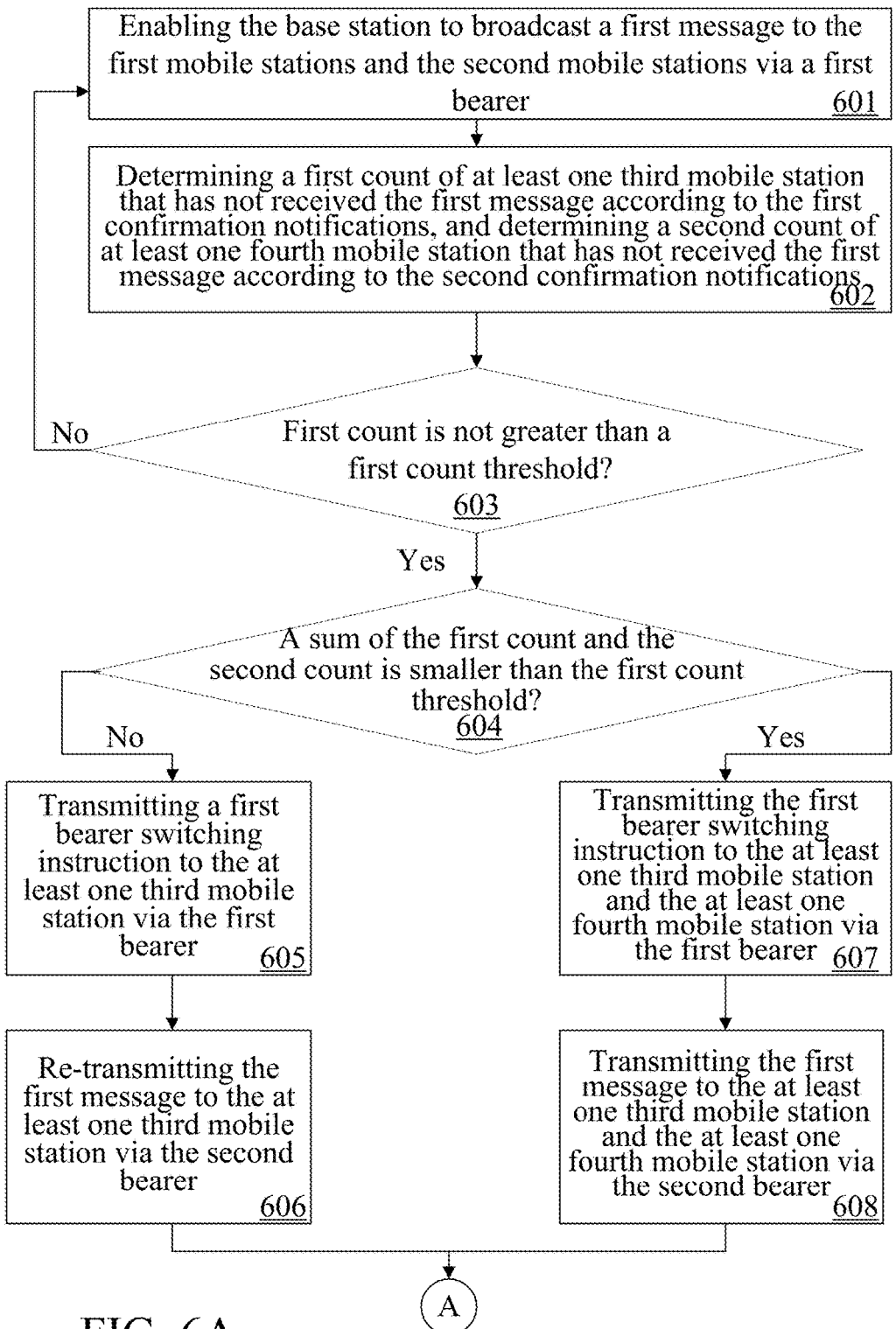
FIG. 6A to FIG. 6B are flowchart diagrams of a data transmission method according to a sixth embodiment of the present invention.
Figure 6B:
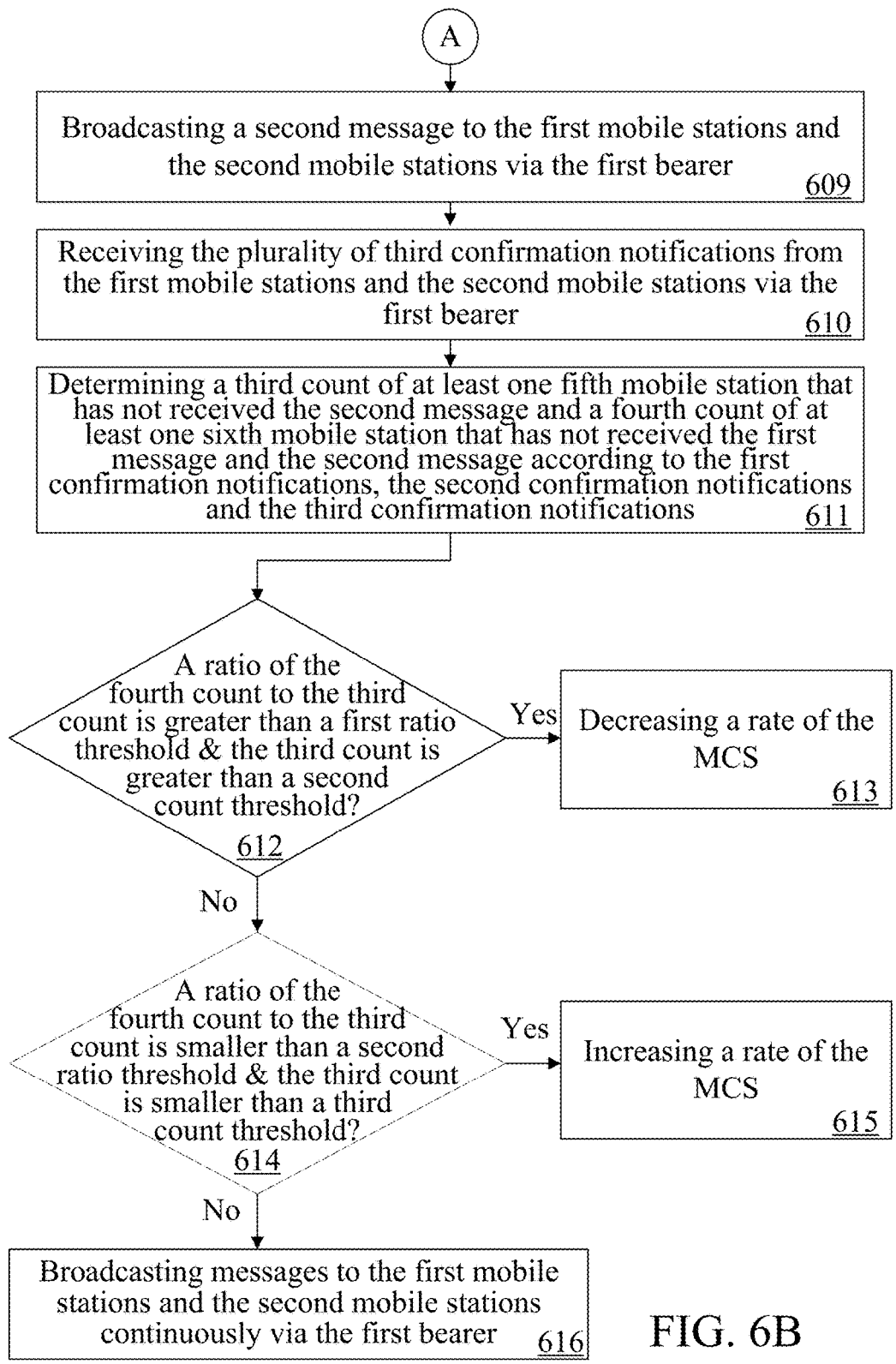

A sixth embodiment of the present invention is a data transmission method, a flowchart diagram of which is as shown in FIG. 6A to FIG. 6B. The method of the sixth embodiment is for use in a base station of an SC-PTM network system (e.g., the SC-PTM network system of the aforesaid embodiments). The SC-PTM further comprises a plurality of first mobile stations belonging to a first mobile station group and a plurality of second mobile stations belonging to a second mobile station group. Detailed steps of the sixth embodiment are as follows.

First, please refer to FIG. 6A. Step 601 is executed to enable the base station to multicast a first message to the plurality of first mobile stations and the plurality of second mobile stations via a first bearer. Thereafter, the plurality of first mobile stations and the plurality of second mobile stations determine whether the first message is successfully received, and then transmit a plurality of first confirmation notifications and a plurality of second confirmation notifications to the base station via the first bearer. Similarly, the plurality of first confirmation notifications and the plurality of second confirmation notifications may include ACKs (which mean that the first message is received correctly) and NACKs (which mean that the first message is not received correctly).

Accordingly, step 602 is executed to enable the base station to determine a first count of at least one third mobile station that has not received the first message according to the first confirmation notifications, and determine a second count of at least one fourth mobile station that has not received the first message according to the second confirmation notifications. Step 603 is executed to enable the base station to determine whether the first count is not greater than a first count threshold.

If the determination result is No, then the step 601 is executed to enable the base station to re-multicast the first message via the first bearer. If the determination result is Yes, then step 604 is executed to enable the base station to determine whether a sum of the first count and the second count is smaller than the first count threshold. If the determination result is No, then step 605 is executed to enable the base station to transmit a first bearer switching instruction to the at least one third mobile station via the first bearer. The first bearer switching instruction is adapted to notify the at least one third mobile station to receive the first message via a second bearer.

Thereafter, step 606 is executed to enable the base station to re-transmit the first message to the at least one third mobile station via the second bearer. On the contrary, if the determination result in the step 604 is Yes, then step 607 is executed to enable the base station to transmit the first bearer switching instruction to the at least one third mobile station and the at least one fourth mobile station via the first bearer. Thereafter, step 608 is executed to enable the base station to transmit the first message to the at least one third mobile station and the at least one fourth mobile station via the second bearer. The base station transmits messages to the at least one third mobile station and the at least one fourth mobile station continuously via the second bearer.

Referring to FIG. 6B, step 609 is executed to enable the base station to multicast a second message to the first mobile stations and the second mobile stations via the first bearer. Similarly, the first mobile stations and the second mobile stations determine whether the second message is successfully received, and then transmit a plurality of third confirmation notifications to the base station via the first bearer. Similarly, the third confirmation notifications may include ACKs (which mean that the second message is received correctly) and NACKs (which means that the second message is not received correctly).

Next, step 610 is executed to enable the base station to receive the plurality of third confirmation notifications from the first mobile stations and the second mobile stations via the first bearer after the step 609. Step 611 is executed to enable the base station to determine (1) a third count of at least one fifth mobile station that has not received the second message and (2) a fourth count of at least one sixth mobile station that has not received the first message and the second message according to the first confirmation notifications, the second confirmation notifications and the third confirmation notifications.

Step 612 is executed to enable the base station to determine whether a ratio of the fourth count to the third count is greater than a first ratio threshold and whether the third count is greater than a second count threshold. If the determination results are all Yes, then step 613 is executed to enable the base station to decrease a rate of the modulating and coding scheme (MCS). On the contrary, if one of the determination results in the step 612 is No, then step 614 is executed to enable the base station to determine whether a ratio of the fourth count to the third count is smaller than a second ratio threshold and whether the third count is smaller than a third count threshold.

If the determination results are all Yes, then step 615 is executed to enable the base station to increase a rate of the MCS. On the contrary, if one of the determination results in the step 614 is No, then step 616 is executed to enable the base station to multicast messages to the first mobile stations and the second mobile stations continuously via the first bearer.

Figure 7A:
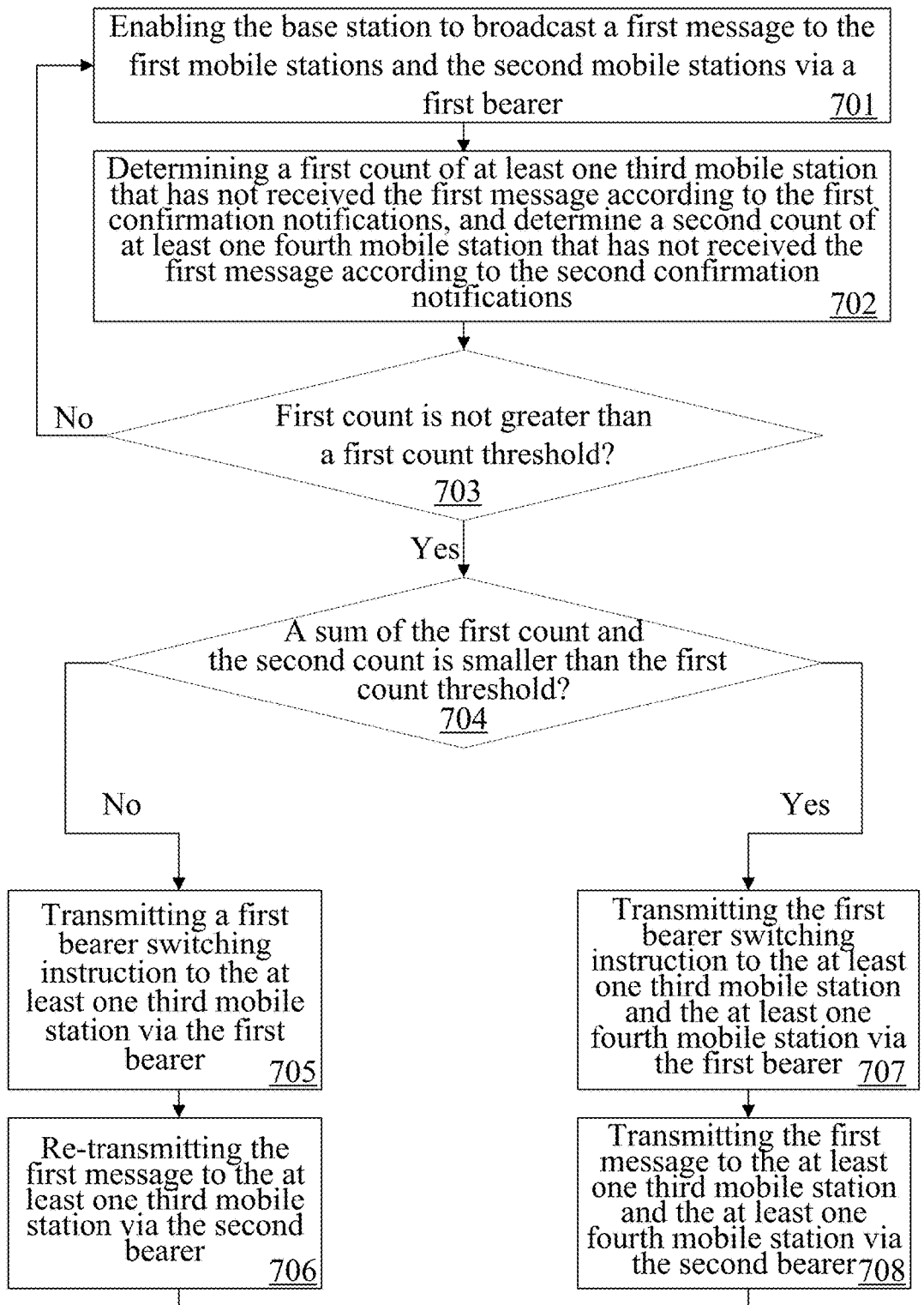
FIG. 7A to FIG. 7B are flowchart diagrams of a data transmission method according to a seventh embodiment of the present invention.
Figure 7B:
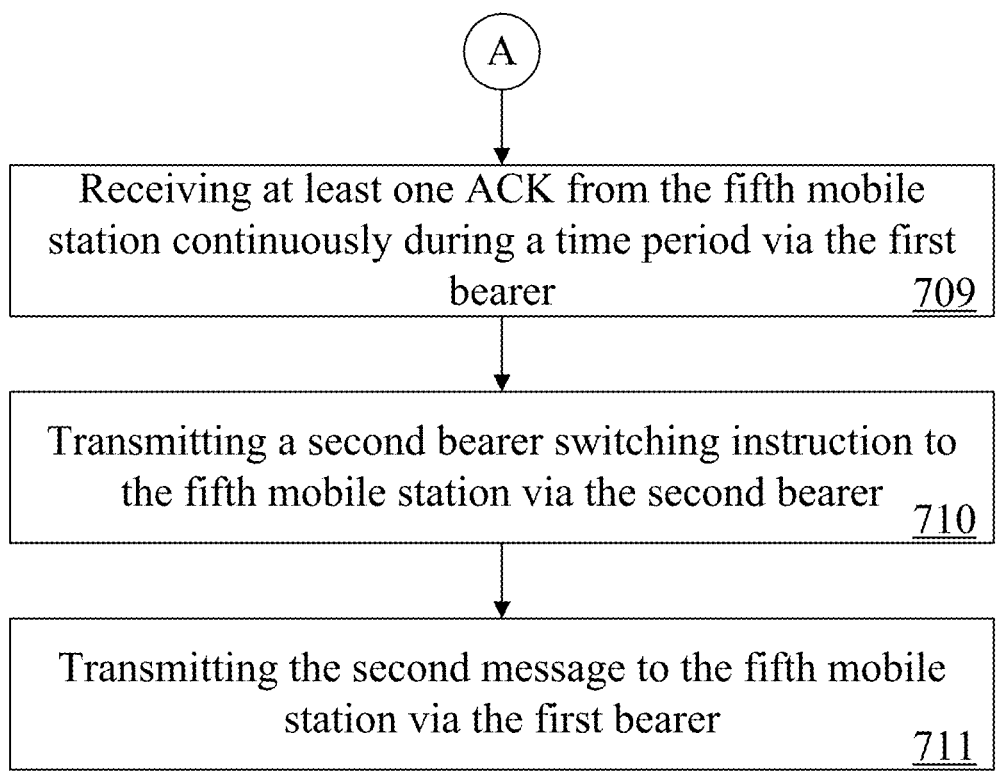

A seventh embodiment of the present invention is a data transmission method, a flowchart diagram of which is as shown in FIG. 7A to FIG. 7B. The method of the seventh embodiment is for use in a base station of an SC-PTM network system (e.g., the SC-PTM network system of the aforesaid embodiments). The SC-PTM further comprises a plurality of first mobile stations belonging to a first mobile station group and a plurality of second mobile stations belonging to a second mobile station group. Detailed steps of the seventh embodiment are as follows.

First, please refer to FIG. 7A. Step 701 is executed to enable the base station to multicast a first message to the plurality of first mobile stations and the plurality of second mobile stations via a first bearer. Thereafter, the plurality of first mobile stations and the plurality of second mobile stations determine whether the first message is successfully received, and then transmit a plurality of first confirmation notifications and a plurality of second confirmation notifications to the base station via the first bearer. Similarly, the plurality of first confirmation notifications and the plurality of second confirmation notifications may include ACKs (which mean that the first message is received correctly) and NACKs (which mean that the first message is not received correctly).

Accordingly, step 702 is executed to enable the base station to determine a first count of at least one third mobile station that has not received the first message according to the first confirmation notifications, and determine a second count of at least one fourth mobile station that has not received the first message according to the second confirmation notifications. Step 703 is executed to enable the base station to determine whether the first count is not greater than a first count threshold.

If the determination result is No, then the step 701 is executed to enable the base station to re-multicast the first message via the first bearer. If the determination result is Yes, then step 704 is executed to enable the base station to determine whether a sum of the first count and the second count is smaller than the first count threshold. If the determination result is No, then step 705 is executed to enable the base station to transmit a first bearer switching instruction to the at least one third mobile station via the first bearer. The first bearer switching instruction is adapted to notify the at least one third mobile station to receive the first message via a second bearer.

Thereafter, step 706 is executed to enable the base station to re-transmit the first message to the at least one third mobile station via the second bearer. On the contrary, if the determination result in the step 704 is Yes, then step 707 is executed to enable the base station to transmit the first bearer switching instruction to the at least one third mobile station and the at least one fourth mobile station via the first bearer. Thereafter, step 708 is executed to enable the base station to transmit the first message to the at least one third mobile station and the at least one fourth mobile station via the second bearer. The base station transmits messages to the at least one third mobile station and the at least one fourth mobile station continuously via the second bearer. The at least one third mobile station and the at least one fourth mobile station include a fifth mobile station.

Next, please refer to FIG. 7B. Step 709 is executed to enable the base station to receive at least one ACK from the fifth mobile station continuously during a time period via the first bearer. Step 710 is executed to enable the base station to transmit a second bearer switching instruction to the fifth mobile station via the second bearer according to the result of the step 709. The second bearer switching instruction is adapted to notify the fifth mobile station to receive a second message via the first bearer. Finally, step 711 is executed to enable the base station to transmit the second message to the fifth mobile station via the first bearer. The base station continuously multicasts messages to the fifth mobile station via the first bearer.

It shall be particularly appreciated that, similarly, during the bearer switching by the base station in the aforesaid embodiment of the method, a step in which different MAC entities are used may be added. In detail, in the aforesaid steps, the base station may forward HARQ information of a first MAC entity for accessing the first bearer to a second MAC entity for accessing the second bearer when it switches from the first bearer to the second bearer.

It shall be further noted that, the base station and the mobile stations in the aforesaid embodiments may respectively be an eNB and UEs under the SC-PTM architecture of the LTE network, and the first bearer may be a multicast bearer and the second bearer may be a split bearer. Further, the base station is capable of implementing different types of second bearer for transmitting messages (e.g., a bearer used for broadcasting messages, a bearer used for multicasting messages or a bearer used for unicasting messages) based on its network resources. However, this is not intended to limit the implementation of the present invention.

According to the above descriptions, the SC-PTM network system and the data transmission method thereof of the present invention mainly can re-transmit data efficiently and correctly under the eMBMS architecture without a satisfactory data re-transmission mechanism. In this way, improvement on the drawbacks of the SC-PTM network system under the conventional eMBMS network architecture can be made.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data transmission method for a base station, the base station being used in a single cell point to multi-points (SC-PTM) network system, the SC-PTM network system further comprising a plurality of first mobile stations and a plurality of second mobile stations, the first mobile stations belonging to a first mobile station group and the second mobile stations belonging to a second mobile station group, and the base station multicasting a first message to the first mobile stations of the first mobile station group and the second mobile stations of the second mobile station group via a first bearer, the data transmission method comprising:

(a) the base station receiving a plurality of first confirmation notifications and a plurality of second confirmation notifications respectively from the first mobile stations and the second mobile stations via the first bearer;

(b) the base station determining a first count of at least one third mobile station that has not received the first message according to the first confirmation notifications, and determining a second count of at least one fourth mobile station that has not received the first message according to the second confirmation notifications;

(c) the base station to determining that the first count is not greater than a first count threshold and a sum of the first count and the second count is greater than the first count threshold;

(d) the base station transmitting a first bearer switching instruction to the at least one third mobile station via the first bearer according to the result of the step (c), wherein the first bearer switching instruction is adapted to notify the at least one third mobile station to receive the first message via a second bearer; and (e) the base station transmitting the first message to the at least one third mobile station via the second bearer, wherein the base station transmits messages to the at least one third mobile station continuously via the second bearer.

2. The data transmission method of claim 1, further comprising the following after the step (d):

(d1) the base station forwarding hybrid automatic repeat request (HARQ) information of a first media access control (MAC) entity for accessing the first bearer to a second MAC entity for accessing the second bearer.

3. The data transmission method of claim 1, further comprising:

(f) the base station multicasting a second message to the first mobile stations and the second mobile stations via the first bearer;

(g) the base station receiving a plurality of third confirmation notifications from the first mobile stations and the second mobile stations via the first bearer after the step (f);

(h) the base station determining a third count of at least one fifth mobile station that has not received the second message and a fourth count of at least one sixth mobile station that has not received the first message and the second message according to the first confirmation notifications, the second confirmation notifications and the third confirmation notifications;

(i) the base station determining that a ratio of the fourth count to the third count is smaller than a ratio threshold and the third count is smaller than a second count threshold; and (j) the base station increasing a rate of the modulating and coding scheme (MCS) according to the result of the step (i).

4. The data transmission method of claim 1, further comprising:

(f) the base station multicasting a second message to the first mobile stations and the second mobile stations via the first bearer;

(g) the base station receiving a plurality of third confirmation notifications from the first mobile stations and the second mobile stations via the first bearer after the step (f);

(h) the base station determining a third count of at least one fifth mobile station that has not received the second message and a fourth count of at least one sixth mobile station that has not received the first message and the second message according to the first confirmation notifications, the second confirmation notifications and the third confirmation notifications;

(i) the base station determining that a ratio of the fourth count to the third count is greater than a ratio threshold and the third count is greater than a second count threshold; and (j) the base station decreasing a rate of the MCS according to the result of the step (i).

5. The data transmission method of claim 1, wherein the at least one third mobile station includes a fifth mobile station, the data transmission method further comprising:

(f) the base station receiving at least one acknowledgement (ACK) from the fifth mobile station continuously during a time period via the first bearer;

(g) the base station transmitting a second bearer switching instruction to the fifth mobile station via the second bearer according to the result of the step (f), wherein the second bearer switching instruction is adapted to notify the fifth mobile station to receive a second message via the first bearer; and (e) the base station transmitting the second message to the fifth mobile station via the first bearer, wherein the base station continuously multicasts messages to the fifth mobile station via the first bearer.

6. A data transmission method for a base station, the base station being used in a single cell point to multi-points (SC-PTM) network system, the SC-PTM network system further comprising a plurality of first mobile stations and a plurality of second mobile stations, the first mobile stations belonging to a first mobile station group and the second mobile stations belonging to a second mobile station group, and the base station multicasting a first message to the first mobile stations of the first mobile station group and the second mobile stations of the second mobile station group via a first bearer, the data transmission method comprising:

(a) the base station receiving a plurality of first confirmation notifications and a plurality of second confirmation notifications respectively from the first mobile stations and the second mobile stations via the first bearer;

(b) the base station determining a first count of at least one third mobile station that has not received the first message according to the first confirmation notifications, and determining a second count of at least one fourth mobile station that has not received the first message according to the second confirmation notifications;

(c) the base station determining that a sum of the first count and the second count is not greater than a first count threshold;

(d) the base station transmitting a first bearer switching instruction to the at least one third mobile station and the at least one fourth mobile station via the first bearer according to the result of the step (c), wherein the first bearer switching instruction is adapted to notify the at least one third mobile station and the at least one fourth mobile station to receive the first message via a second bearer; and (e) the base station transmitting the first message to the at least one third mobile station and the at least one fourth mobile station via the second bearer, wherein the base station transmits messages to the at least one third mobile station and the at least one fourth mobile station continuously via the second bearer.

7. The data transmission method of claim 6, further comprising after the step (d):

(d1) the base station forwarding HARQ information of a first MAC entity for accessing the first bearer to a second MAC entity for accessing the second bearer.

8. The data transmission method of claim 6, further comprising:

(f) the base station multicasting a second message to the first mobile stations and the second mobile stations via the first bearer;

(g) the base station receiving a plurality of third confirmation notifications from the first mobile stations and the second mobile stations via the first bearer after the step (f);

(h) the base station determining a third count of at least one fifth mobile station that has not received the second message and a fourth count of at least one sixth mobile station that has not received the first message and the second message according to the first confirmation notifications, the second confirmation notifications and the third confirmation notifications;

(i) the base station determining that a ratio of the fourth count to the third count is smaller than a ratio threshold and the third count is smaller than a second count threshold; and (j) the base station increasing a rate of the MCS according to the result of the step (i).

9. The data transmission method of claim 6, further comprising:

(f) the base station multicasting a second message to the first mobile stations and the second mobile stations via the first bearer;

(g) the base station receiving a plurality of third confirmation notifications from the first mobile stations and the second mobile stations via the first bearer after the step (f);

(h) the base station determining a third count of at least one fifth mobile station that has not received the second message and a fourth count of at least one sixth mobile station that has not received the first message and the second message according to the first confirmation notifications, the second confirmation notifications and the third confirmation notifications;

(i) the base station determining that a ratio of the fourth count to the third count is greater than a ratio threshold and the second count is greater than a second count threshold; and (j) the base station decreasing a rate of the MCS according to the result of the step (i).

10. The data transmission method of claim 6, wherein the at least one third mobile station and the at least one fourth mobile station include a fifth mobile station, the data transmission method further comprising:

(f) the base station receiving at least one acknowledgement (ACK) from the fifth mobile station continuously during a time period via the first bearer;

(g) the base station transmitting a second bearer switching instruction to the fifth mobile station via the second bearer according to the result of the step (f), wherein the second bearer switching instruction is adapted to notify the fifth mobile station to receive a second message via the first bearer; and (e) the base station transmitting the second message to the fifth mobile station via the first bearer, wherein the base station continuously multicasts messages to the fifth mobile station via the first bearer.

11. A data transmission method for a mobile station, the mobile station being used in an SC-PTM network system and belonging to a first mobile station group, the SC-PTM network system further comprising a base station, and the base station multicasting a first message to the first mobile station group via a first bearer, the data transmission method comprising:

(a) the mobile station determining that reception of the first message fails;

(b) the mobile station transmit a negative acknowledgement (NACK) to the base station via the first bearer according to the result of the step (a);

(c) the mobile station receiving a first bearer switching instruction from the base station via the first bearer after the step (b); and (d) the mobile station receiving the first message from the base station via a second bearer according to the first bearer switching instruction, wherein the mobile station continuously receives via the second bearer messages transmitted by the base station.

12. The data transmission method of claim 11, further comprising:
(e) the mobile station transmitting at least one ACK to the base station continuously during a time period via the first bearer;
(f) the mobile station receiving a second bearer switching instruction from the base station via the second bearer after the step (e); and
(g) the mobile station receiving a second message via the first bearer according to the second bearer switching instruction, wherein the mobile station continuously receives via the first bearer messages multicasted by the base station.

13. A base station being used in an SC-PTM network system, the SC-PTM network system further comprising a plurality of first mobile stations and a plurality of second mobile stations, and the first mobile stations belonging to a first mobile station group and the second mobile stations belonging to a second mobile station group, the base station comprising:
a transceiving unit; and
a processing unit;
wherein the processing unit is configured to:
multicast a first message to the first mobile stations of the first mobile station group and the second mobile stations of the second mobile station group via a first bearer by use of the transceiving unit;
receive a plurality of first confirmation notifications and a plurality of second confirmation notifications respectively from the first mobile stations and the second mobile stations via the first bearer by use of the transceiving unit;
determine a first count of at least one third mobile station that has not received the first message according to the first confirmation notifications, and determine a second count of at least one fourth mobile station that has not received the first message according to the second confirmation notifications;
determine that the first count is not greater than a first count threshold and a sum of the first count and the second count is greater than the first count threshold;
transmit a first bearer switching instruction to the at least one third mobile station via the first bearer by use of the transceiving unit according to the result that the first count is not greater than the first count threshold and the sum of the first count and the second count is greater than the first count threshold, wherein the first bearer switching instruction is adapted to notify the at least one third mobile station to receive the first message via a second bearer; and
transmit the first message to the at least one third mobile station via the second bearer by use of the transceiving unit, wherein the transceiving unit transmits messages to the at least one third mobile station continuously via the second bearer.

14. The base station of claim 13, wherein the transceiving unit further comprises a first MAC entity for accessing the first bearer and a second MAC entity for accessing the second bearer, and the processing unit is further configured to:
forward HARQ information of the first MAC entity to the second MAC entity.

15. The base station of claim 13, wherein the processing unit is further configured to:
multicast a second message to the first mobile stations and the second mobile stations via the first bearer by use of the transceiving unit;
receive a plurality of third confirmation notifications from the first mobile stations and the second mobile stations via the first bearer by use of the transceiving unit;
determine a third count of at least one fifth mobile station that has not received the second message and a fourth count of at least one sixth mobile station that has not received the first message and the second message according to the first confirmation notifications, the second confirmation notifications and the third confirmation notifications;
determine that a ratio of the fourth count to the third count is smaller than a ratio threshold and the third count is smaller than a second count threshold; and
increase a rate of the MCS according to the result that the ratio of the fourth count to the third count is smaller than the ratio threshold and the third count is smaller than the second count threshold.

16. The base station of claim 13, wherein the processing unit is further configured to:
multicast a second message to the first mobile stations and the second mobile stations via the first bearer by use of the transceiving unit;
receive a plurality of third confirmation notifications from the first mobile stations and the second mobile stations via the first bearer by use of the transceiving unit;
determine a third count of at least one fifth mobile station that has not received the second message and a fourth count of at least one sixth mobile station that has not received the first message and the second message according to the first confirmation notifications, the second confirmation notifications and the third confirmation notifications;
determine that a ratio of the fourth count to the third count is greater than a ratio threshold and the third count is greater than a second count threshold; and
decrease a rate of the MCS according to the result that the ratio of the fourth count to the third count is greater than the ratio threshold and the third count is greater than the second count threshold.

17. The base station of claim 13, wherein the at least one third mobile station includes a fifth mobile station, and the processing unit is further configured to:
receive at least one ACK from the fifth mobile station continuously during a time period via the first bearer by use of the transceiving unit;
transmit a second bearer switching instruction to the fifth mobile station via the second bearer by use of the transceiving unit according to the result of receiving the at least one ACK continuously during the time period via the first bearer, wherein the second bearer switching instruction is adapted to notify the fifth mobile station to receive a second message via the first bearer; and
transmit the second message to the fifth mobile station via the first bearer by use of the transceiving unit, wherein the transceiving unit continuously multicasts messages to the fifth mobile station via the first bearer.

18. A base station being used in an SC-PTM network system, the SC-PTM network system further comprising a plurality of first mobile stations and a plurality of second mobile stations, and the first mobile stations belonging to a first mobile station group and the second mobile stations belonging to a second mobile station group, the base station comprising:
a transceiving unit; and
a processing unit;
wherein the processing unit is configured to:
multicast a first message to the first mobile stations of the first mobile station group and the second mobile stations of the second mobile station group via a first bearer by use of the transceiving unit;
receive a plurality of first confirmation notifications and a plurality of second confirmation notifications respectively from the first mobile stations and the second mobile stations via the first bearer by use of the transceiving unit;
determine a first count of at least one third mobile station that has not received the first message according to the first confirmation notifications, and determine a second count of at least one fourth mobile station that has not received the first message according to the second confirmation notifications;
determine that a sum of the first count and the second count is not greater than the first count threshold;
transmit a first bearer switching instruction to the at least one third mobile station and the at least one fourth mobile station via the first bearer by use of the transceiving unit according to the result that the sum of the first count and the second count is not greater than the first count threshold, wherein the first bearer switching instruction is adapted to notify the at least one third mobile station and the at least one fourth mobile station to receive the first message via a second bearer; and
transmit the first message to the at least one third mobile station and the at least one fourth mobile station via the second bearer by use of the transceiving unit, wherein the transceiving unit transmits messages to the at least one third mobile station and the at least one fourth mobile station continuously via the second bearer.

19. The base station of claim 18, wherein the transceiving unit further comprises a first MAC entity for accessing the first bearer and a second MAC entity for accessing the second bearer, and the processing unit is further configured to:
forward HARQ information of the first MAC entity to the second MAC entity.

20. The base station of claim 18, wherein the processing unit is further configured to:
multicast a second message to the first mobile stations and the second mobile stations via the first bearer by use of the transceiving unit;
receive a plurality of third confirmation notifications from the first mobile stations and the second mobile stations via the first bearer by use of the transceiving unit;
determine a third count of at least one fifth mobile station that has not received the second message and a fourth count of at least one sixth mobile station that has not received the first message and the second message according to the first confirmation notifications, the second confirmation notifications and the third confirmation notifications;
determine that a ratio of the fourth count to the third count is smaller than a ratio threshold and the third count is smaller than a second count threshold; and
increase a rate of the MCS according to the result that the ratio of the fourth count to the third count is smaller than the ratio threshold and the third count is smaller than the second count threshold.

21. The base station of claim 18, wherein the processing unit is further configured to:
multicast a second message to the first mobile stations and the second mobile stations via the first bearer by use of the transceiving unit;
receive a plurality of third confirmation notifications from the first mobile stations and the second mobile stations via the first bearer by use of the transceiving unit;
determine a third count of at least one fifth mobile station that has not received the second message and a fourth count of at least one sixth mobile station that has not received the first message and the second message according to the first confirmation notifications, the second confirmation notifications and the third confirmation notifications;
determine that a ratio of the fourth count to the third count is greater than a ratio threshold and the third count is greater than a second count threshold; and
decrease a rate of the MCS according to the result that the ratio of the fourth count to the third count is greater than the ratio threshold and the third count is greater than the second count threshold.

22. The base station of claim 18, wherein the at least one third mobile station and the at least one fourth mobile station include a fifth mobile station, and the processing unit is further configured to:
receive at least one ACK from the fifth mobile station continuously during a time period via the first bearer by use of the transceiving unit;
transmit a second bearer switching instruction to the fifth mobile station via the second bearer by use of the transceiving unit according to the result of receiving the at least one ACK continuously during a time period, wherein the second bearer switching instruction is adapted to notify the fifth mobile station to receive a second message via the first bearer; and
transmit the second message to the fifth mobile station via the first bearer by use of the transceiving unit, wherein the transceiving unit continuously multicasts messages to the fifth mobile station via the first bearer.

23. A mobile station being used in an SC-PTM network system, the mobile station belonging to a first mobile station group, and the SC-PTM network system further comprising a base station, the mobile station comprising:
a transceiving unit; and
a processing unit;
wherein the processing unit is configured to:
receive a first message from the base station via a first bearer by use of the transceiving unit;
determine that reception of the first message fails;
transmit an NACK to the base station via the first bearer by use of the transceiving unit according to the result that reception of the first message fails;
receive a first bearer switching instruction from the base station via the first bearer by use of the transceiving unit; and
receive the first message from the base station via a second bearer by use of the transceiving unit according to the first bearer switching instruction, wherein the transceiving unit continuously receives via the second bearer messages transmitted by the base station.

24. The mobile station of claim 23, wherein the mobile station belongs to a first mobile station group, the first bearer switching instruction is adapted to notify mobile stations of the first mobile station group to receive the first message via the second bearer.

25. The mobile station of claim 23, wherein the processing unit is further configured to:
- continuously transmit at least one ACK to the base station during a time period via the first bearer by use of the transceiving unit;
- receive a second bearer switching instruction from the base station via the second bearer by use of the transceiving unit; and
- receive a second message via the first bearer by use of the transceiving unit according to the second bearer switching instruction, wherein the mobile station continuously receives via the first bearer messages multicasted by the base station.

* * * * *